(12) United States Patent
Binder et al.

(10) Patent No.: US 10,792,799 B2
(45) Date of Patent: Oct. 6, 2020

(54) POWER TOOL WITH MAGNETO-PNEUMATIC STRIKING MECHANISM

(71) Applicant: Hilti Aktiengesellschaft, Schaan (LI)

(72) Inventors: Albert Binder, Buchs (CH); Christoph Hakenholt, Feldkirch (AT); Jochen Kuntner, Dornbirn (AT)

(73) Assignee: Hilti Aktiengesellschaft, Schaan (LI)

( * ) Notice: Subject to any disclaimer, the term of this patent is extended or adjusted under 35 U.S.C. 154(b) by 1615 days.

(21) Appl. No.: 13/916,184

(22) Filed: Jun. 12, 2013

(65) Prior Publication Data

US 2013/0333911 A1 Dec. 19, 2013

(30) Foreign Application Priority Data

Jun. 15, 2012 (DE) .................. 10 2012 210 104

(51) Int. Cl.
| | | |
|---|---|---|
| *B25D 3/00* | (2006.01) | |
| *H02K 35/00* | (2006.01) | |
| *B25D 11/06* | (2006.01) | |
| *H01F 7/16* | (2006.01) | |
| *H02K 33/12* | (2006.01) | |

(52) U.S. Cl.
CPC ......... *B25D 11/064* (2013.01); *H01F 7/1615* (2013.01); *H02K 33/12* (2013.01); *H01F 2007/1692* (2013.01)

(58) Field of Classification Search
CPC ........ B25D 11/064; B25D 11/06; B25D 3/00; H01F 7/1615; H02K 33/12; H02K 35/00
USPC .......... 173/212, 117, 1, 2; 30/362, 277, 367, 30/169
See application file for complete search history.

(56) References Cited

U.S. PATENT DOCUMENTS

| | | | |
|---|---|---|---|
| 262,319 A | 8/1882 | Ritz et al. | |
| 3,894,817 A * | 7/1975 | Majoros ................ | F04B 17/046 310/30 |
| 4,004,258 A * | 1/1977 | Arnold .................. | F16K 31/082 137/554 |
| 4,785,210 A * | 11/1988 | Maruyama ............... | G03B 3/10 310/12.01 |
| 4,847,581 A | 7/1989 | Mohler | |

(Continued)

FOREIGN PATENT DOCUMENTS

| | | |
|---|---|---|
| DE | 28 21 842 | 11/1979 |
| DE | 94 13 686 | 12/1994 |
| DE | 44 03 420 | 8/1995 |
| DE | 10 2007 000 386 | 1/2009 |

(Continued)

*Primary Examiner* — Chelsea E Stinson
*Assistant Examiner* — Mary C Hibbert-Copeland
(74) *Attorney, Agent, or Firm* — Davidson, Davidson & Kappel, LLC

(57) ABSTRACT

A power tool 1 including a bit socket 6 which is configured to hold a chiseling bit 7 so that the latter can move along an axis of movement 3. A magneto-pneumatic striking mechanism 2 includes a primary drive 22 that is arranged around the axis of movement 3 and that has a first magnet coil 46, a permanently and radially magnetizable ring magnet 42 and a second magnet coil 47 arranged consecutively in the striking direction 5. On the axis of movement 3, inside the magnet coils 46, 47, the striking mechanism 2 has a striker 4 and a striking block 13 arranged consecutively in the striking direction 5. An air cushion 23 acts upon the striker 4 in the striking direction 5.

19 Claims, 4 Drawing Sheets

(56) References Cited

U.S. PATENT DOCUMENTS

| | | | | |
|---|---|---|---|---|
| 5,200,728 | A * | 4/1993 | Patterson | H01F 7/1607 335/223 |
| 5,389,910 | A * | 2/1995 | Abel | H01F 7/1615 335/237 |
| 5,497,555 | A * | 3/1996 | Averbukh | B25D 11/064 173/117 |
| 6,520,269 | B2 | 2/2003 | Geiger et al. | |
| 6,854,530 | B1 * | 2/2005 | Yiu | B25C 1/06 173/1 |
| 7,025,183 | B2 | 4/2006 | Steffen et al. | |
| 8,534,377 | B2 | 9/2013 | Berger et al. | |
| 9,259,830 | B2 | 2/2016 | Schad et al. | |
| 2008/0202783 | A1 | 8/2008 | Schaer et al. | |
| 2010/0206593 | A1 * | 8/2010 | Schad | B25D 11/064 173/128 |

FOREIGN PATENT DOCUMENTS

| | | |
|---|---|---|
| DE | 10 2009 000 363 | 7/2010 |
| EP | 0286680 | 10/1988 |
| EP | 1607186 | 6/2004 |
| EP | 2 043 238 | 4/2009 |
| GB | 2 205 003 | 11/1988 |
| JP | H0241649 | 2/1990 |
| JP | H0755041 B2 | 6/1995 |
| JP | H10336994 | 12/1998 |
| JP | 2000167783 | 6/2000 |
| JP | 2002-011676 | 1/2002 |
| JP | 2005516783 | 6/2005 |
| JP | 2008194820 | 8/2008 |
| JP | 2008544871 | 12/2008 |
| JP | 2010-167558 | 8/2010 |
| WO | WO1988002666 | 4/1988 |

* cited by examiner

POWER TOOL WITH MAGNETO-PNEUMATIC STRIKING MECHANISM

This claims the benefit of German Patent Application DE 10 2012 210 104.7, filed Jun. 15, 2012 and hereby incorporated by reference herein.

The present invention relates to a power tool that can drive a chiseling bit. A striker is accelerated directly by magnet coils and strikes the bit.

BACKGROUND

Power tools of this type are known, for example, from the publication U.S. 2010/0206593.

SUMMARY OF THE INVENTION

It is an object of the present invention to provide a power tool having a bit socket which is configured to hold a chiseling bit so that the latter can move along an axis of movement. A magneto-pneumatic striking mechanism comprises a primary drive that is arranged around the axis of movement and that has a first magnet coil, a ring magnet and a second magnet coil arranged consecutively in the striking direction. On the axis of movement, inside the magnet coils, the striking mechanism has a striker and a striking block arranged consecutively in the striking direction. An air cushion acts upon the striker in the striking direction. The air cushion can be situated, for example, partially or entirely inside the first magnet coil. The ring magnet is permanently magnetic and magnetized radially relative to the axis of movement. The ring magnet consists, for instance, of several permanent magnets that are all facing the axis of movement with one magnetic pole, e.g. the north pole (N), while they face away from the axis of movement with another magnetic pole, e.g. the south pole (S).

The permanent magnets, which are oriented essentially along the radial direction, generate a magnetic field that runs in opposite directions inside the first magnet coil and the second magnet coil. This asymmetry can be utilized to set the magnetic field strength inside the two magnet coils in a counter-phase at a high value and at a low value. The gradient of the magnetic field strength moves the striker on the basis of the reluctance force.

One embodiment provides that a current fed into the first magnet coil and a current fed into the second magnet coil have the same direction of rotation around the axis of movement. The magnetic fields generated by the first and second magnet coils are both oriented parallel or else anti-parallel to the striking direction.

One embodiment provides that a control unit actuates the magnet coils in alternating phases. A first magnetic field generated by the first magnet coil inside the first magnet coil is superimposed with the magnetic field of the ring magnet constructively in a first phase and destructively in a second phase, while a second magnetic field generated by the second magnet coil inside the second magnet coil is superimposed with the magnetic field of the ring magnet destructively in the first phase and constructively in the second phase.

The striker can be made of a soft-magnetic material. The striker itself need not generate a magnetic field. Any residual magnetization of the striker either subsides quickly or else its field strength is less than the field strength of the magnet coils or of the ring material by at least one order of magnitude. The striker is driven on the basis of the reluctance force of the magnetic fields. The striking block is likewise preferably made of a soft-magnetic material.

One embodiment provides that the striking block projects into the second magnet coil or into a yoke adjoining the second magnet coil as seen in the striking direction. The magnetizable striking block directs the magnetic field. The magnetic field generated by the second magnet coil exits the striking block essentially parallel to the striking direction, that is to say, it runs essentially perpendicular to the end face of the striking block. The magnetic field generated by the ring magnet likewise enters the striking block essentially perpendicular to the end face. This allows a high field strength close to the end face.

One embodiment provides that the air cushion is closed off opposite from the striking direction by means of a stationary closure. The stationary closure is immovable with respect to the magnet coils, the bit socket, etc. Except for a ventilation opening, the pneumatic chamber of the air cushion is isolated from the environment. The ventilation opening is situated at the axial height of one end of the first magnet coil facing the ring magnet.

One embodiment provides that, in every position, the striker partially overlaps at least one of the magnet coils, and partially the ring magnet. The striker can preferably project in every position into the first magnet coil with one part and into the second magnet coil with the other part.

One embodiment provides that a first length of the first magnet coil is smaller than a second length of the second magnet coil, in particular, the ratio of the second length to the first length is between 1.75 and 2.25. The asymmetry proves to be more favorable for a high impact energy.

One embodiment provides that the first magnet coil, the ring magnet and the second magnet coil are arranged around a guide tube oriented coaxially to the axis of movement, and the air cushion, the striker and the striking block are arranged inside the guide tube.

BRIEF DESCRIPTION OF THE DRAWINGS

The description below explains the invention on the basis of embodiments and figures provided by way of examples. The figures show the following.

DETAILED DESCRIPTION

Figure 1:
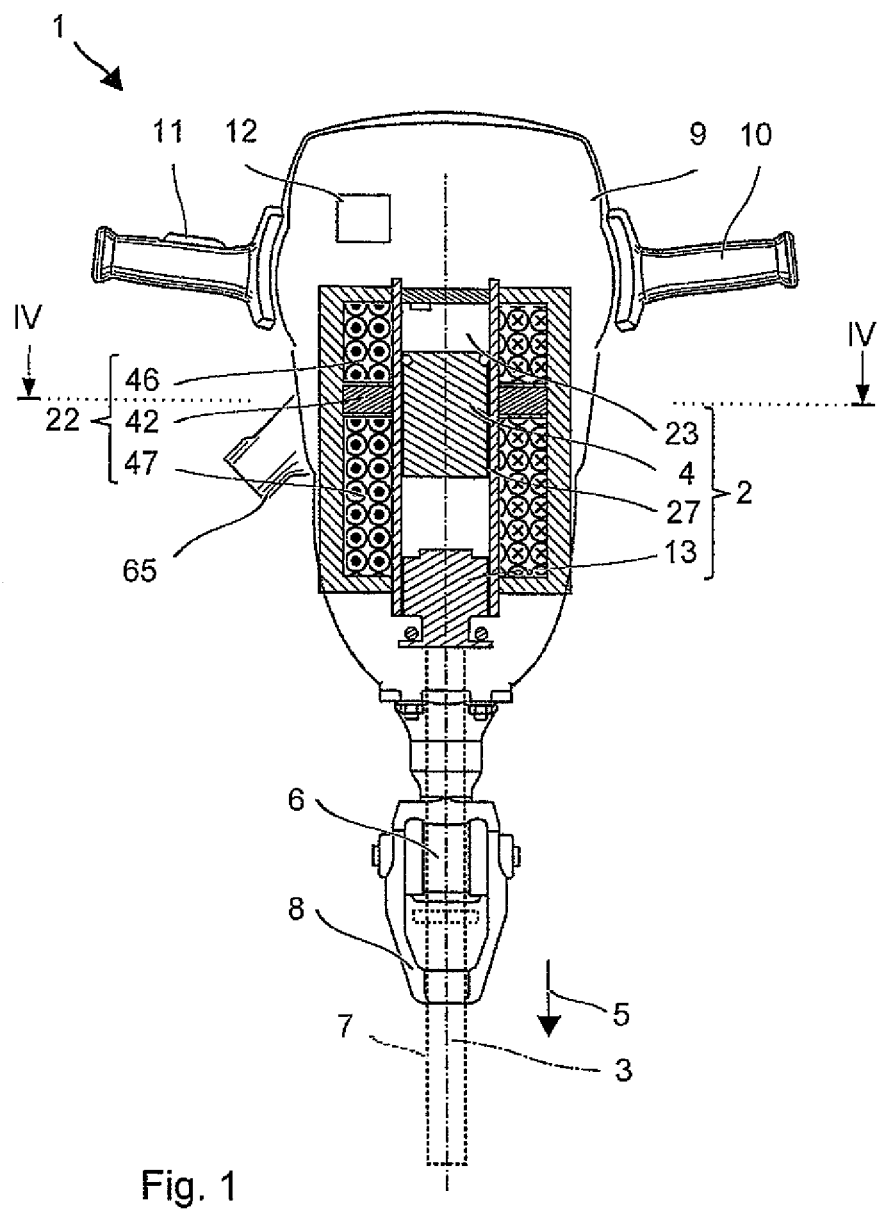
FIG. 1: an electric chisel.

Unless otherwise indicated, identical or functionally equivalent elements are designated by the same reference numerals in the figures.

FIG. 1 schematically shows a hand-held electric chisel 1 as an example of a chiseling power tool. Via a striker 4 guided along a movement axis 3, a magneto-pneumatic striking mechanism 2 generates periodic or non-periodic strikes in a striking direction 5. A bit socket 6 holds a chiseling bit 7 in contact with the striking mechanism 2 on the movement axis 3. The chiseling bit 7 is secured in the bit socket 6 so as to move along the movement axis 3 and can penetrate, for example, into a substrate in that it is driven in the striking direction 5 by the impact. A lock 8 limits the axial movement of the chiseling bit 7 in the bit socket 6. The lock 8 is, for instance, a pivotable bracket and it can be unlocked manually, preferably without the need for auxiliary means, in order to replace the chiseling bit 7.

The striking mechanism 2 is situated in a machine housing 9. A handle 10 attached to the machine housing 9 allows the user to hold the electric chisel 1 and to guide it during operation. A system switch 11 with which the user can put the striking mechanism 2 into operation is preferably installed on the handle 10. The system switch 11 activates, for instance, a control unit 12 of the striking mechanism 2.

Figure 2:
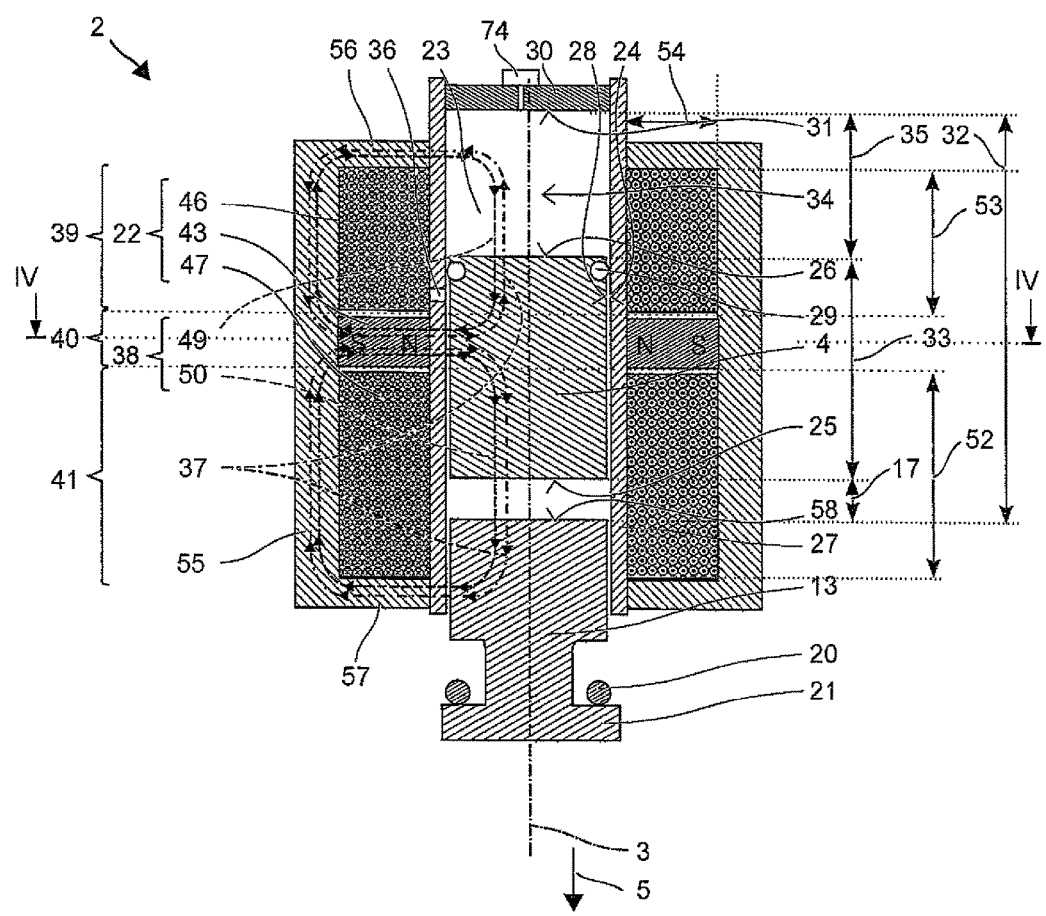
FIG. 2: a striking mechanism of the electric chisel.

FIG. 2 shows the magneto-pneumatic striking mechanism 2 in a lengthwise sectional view. The striking mechanism 2 has only two moving components: a striker 4 and a striking block 13. The striker 4 and the striking block 13 are located on the shared movement axis 3; the striking block 13 follows the striker 4 in the impact direction 5. The striker 4 is moved back and forth between a striking point 14 and an upper turning point 15 on the movement axis 3.

The striker 4 meets the striking block 13 at the striking point 14. The position of the striking point 14 along the axis is determined by the striking block 13. The striking block 13 is preferably resting in its basic position 16 and preferably returns to this basic position 16 after every strike, before the striker 4 strikes the striking block 13 the next time. This preferred mode of operation is taken as the basis for the description below. However, in contrast to a conventional pneumatic striking mechanism 2, the magneto-pneumatic striking mechanism 2 here has a high tolerance in terms of the actual position of the striking block 13. At the time of a strike, the striking block can still be extended in the striking direction 5 as compared to the basic position 16. Therefore, the basic position 16 defines the earliest position in the striking direction 5 in which the striker 4 can strike the striking block 13.

Figure 3:
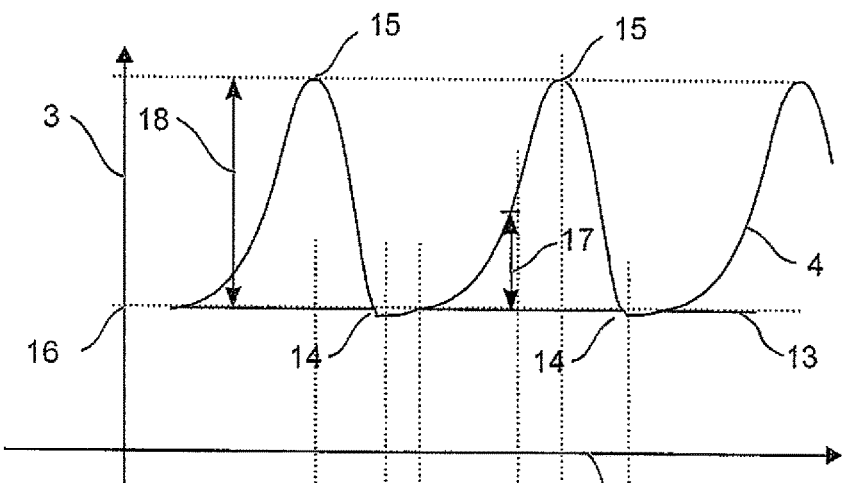
FIG. 3: the movement of the striker and striking block.

The distance 17 between the striker 4 and the striking block 13 is at its greatest value in the upper turning point 15; the distance traversed by the striker 4 will be referred to below as the stroke 18. FIG. 3 schematically illustrates the movement of the striker 4 and of the striking block 13 in the case of three consecutive strikes over the course of time 19.

In its resting position, the striker 4 is typically in contact with the striking block 13. For a strike, the striker 4 is moved back opposite from the striking direction 5 and, after reaching the upper turning point 15, it is accelerated in the striking direction 5. At the end of its movement in the striking direction 5, the striker 4 strikes the striking block 13 at the striking point 14. The striking block 13 absorbs substantially more than half of the kinetic energy of the striker 4 and is deflected in the striking direction 5. The chiseling bit 7 that is in contact with the striking block 13 is pushed ahead of the striking block 13 in the striking direction 5 and into the substrate. The user presses the striking mechanism 2 against the substrate in the striking direction 5, as a result of which the striking block 13 is pushed back into its basic position 16, preferably indirectly by means of the chiseling bit 7. In the basic position, the striking block 13 is in contact with a stop 20 attached to the housing in the striking direction 5. The stop 20 can have, for example, a damping element. The striking block 13, shown here by way of an example, has radially projecting wings 21 that can be in contact with the stop 20.

The striker 4 is driven contactlessly by a magnetic, primary drive 22. The primary drive 22 raises the striker 4 opposite to the striking direction 5. As is elaborated upon below, the primary drive 22 is preferably only active at times during the raising of the striker 4 to the upper turning point 15. The primary drive 22 accelerates the striker 4 after passing the upper turning point 15 until the striking point 14 is reached. The primary drive 22 can be activated at approximately the same time as when the upper turning point 15 is passed. Preferably, the primary drive 22 remains active until the strike. Starting at the upper turning point until shortly before the striking point, an air cushion 23 assists the primary drive 22 during the movement of the striker 4 in the striking direction 5. The air cushion 23 is locked on the movement axis 3 in front of the striker 4 as seen in the striking direction 5 and it acts upon the striker 4.

The striker 4 consists primarily of a cylindrical base body whose lateral surface 24 is parallel to the movement axis 3. A front end face 25 faces in the striking direction 5. The front end face 25 is flat and covers the entire cross section of the striker 4. A rear end face 26 is preferably likewise flat. The striker 4 is inserted into a guide tube 27. The guide tube 27 is coaxial to the movement axis 3 and it has a cylindrical inner wall 28. The lateral surface 24 of the striker 4 is in contact with the inner wall 28. The striker 4 is forcibly guided in the guide tube 27 on the movement axis 3. A cross section of the striker 4 and a hollow cross section of the guide tube 27 are coordinated with each other with a precise fit, except for a slight play. The striker 4 closes off the guide tube 27 like a floating seal. A sealing gasket 29 made of rubber that is inserted into the lateral surface 24 can compensate for manufacturing tolerances.

The guide tube 27 is closed off at its front end as seen in the striking direction 5. In the embodiment given by way of an example, a closure 30 whose cross section matches the hollow cross section of the guide tube 27 is inserted into the guide tube 27. The closure surface 31, which is oriented inwards, is preferably flat and perpendicular to the movement axis 3. The closure 30 is installed at a fixed distance 32 from the striking block 13 that rests in the basic position 16. In the basic position 16, the cavity between the closure 30 and the striking block 13 is the effective section of the guide tube 27 for the striker 4 within which the striker 4 can move. The maximum stroke 18 is essentially the distance 32 minus the length 33 of the striker 4.

The tube 27, which is closed off on one side, and the striker 4 close off a pneumatic chamber 34. The volume of the pneumatic chamber 34 is proportional to the distance 35 between the closure surface 31 and the rear end face 26 of the striker. The volume is variable since the striker 4 can move along the movement axis 3. The air that is compressed or decompressed when there is movement in the pneumatic chamber 34 brings about the effect of the air cushion 23. The pneumatic chamber 34 attains its maximum volume at the striking point 14, that is to say, when the striker 4 hits the striking block 13. In this context, the pressure in the pneumatic chamber 34 is at its minimum value and advantageously equals the ambient pressure. By definition, the potential energy of the air cushion 23 at the striking point 14 equals zero. The pneumatic chamber 34 attains its minimum volume at the upper turning point 15 of the striker 4; the pressure can rise up about 16 bar. The stroke of the striker 4 is limited by a regulation process so that the volume and the pressure in the pneumatic chamber 34 at the upper turning point 15 can be set to a target value. The potential energy of the air cushion 23 at the upper turning point 15 should lie within a narrow range of values, irrespective of external influences. This especially renders the striking mechanism 2 robust vis-à-vis the position of the striking block 13 during impact, even though its position greatly influences the travel time of the striker 4 all the way to the upper turning point 15.

The air cushion 23 is provided with one or more ventilation openings 36 in order to compensate for losses in the amount of air in the air cushion 23. The ventilation openings 36 are closed off by the striker 4 during the compression of the air cushion 23. Preferably, the striker 4 opens the ventilation openings 36 shortly before the striking point 14 when the pressure in the air cushion 23 differs from the ambient pressure by less than 50%. In the embodiment given by way of an example, the striker 4 travels beyond the one ventilation opening 36 when it has moved away from the striking position by more than 5% of its stroke 18.

The primary drive 22 is based on reluctance forces that act upon the striker 4. The base body of the striker 4 is made of a soft-magnetic steel. When compared to a permanent magnet, the striker 4 stands out for its very low coercive field strength of less than 4000 μm, preferably less than 2500 μm. An external magnetic field having such a low field strength can already reverse the polarity of the striker 4. An applied external magnetic field attracts the magnetizable striker 4 into areas of the highest field strength, irrespective of the polarity.

Along the movement axis 3, the primary drive 22 has a cavity into which the guide tube 27 is inserted. The primary drive 22 generates a permanent magnetic field 37 and a two-part switchable magnetic field 38 inside the cavity and inside the guide tube. The magnetic fields 37, 38 divide the cavity and the effective section of the guide tube 27 along the movement axis 3 into an upper section 39, a middle section 40 and a lower section 41. In the upper section 39 and in the lower section 41, field lines of the magnetic fields 37, 38 run largely parallel to the movement axis 3 and, in the middle section 40, largely perpendicular to the movement axis 3. The magnetic fields 37, 38 differ in terms of their parallel or anti-parallel orientation of the field lines with respect to the striking direction 5. The field lines—sections of which are shown by way of an example (dot-dash pattern)—of the permanent magnetic field 37 run largely anti-parallel to the striking direction 5 in the upper section 39 of the guide tube 27, and largely parallel to the striking direction 5 in a lower section 41 of the guide tube 27. When it comes to the function of the striking mechanism 2, the different running directions of the field lines of the permanent magnetic field 37 in the upper section 39 as compared to the running direction in the lower section 41 are significant. The field lines of the switchable magnetic field 38 run largely in the striking direction 5 during one phase (indicate by the dashes) inside the upper section 39 and the lower section 41 of the guide tube 27, whereas they run largely anti-parallel to the striking direction 5 during another phase (not shown here) inside both sections 39, 41. The permanent magnetic field 37 and the switchable magnetic field 38 are thus superimposed destructively in one of the two sections 39 and constructively in the other of the sections 41. The sections 39 in which the magnetic fields 37, 38 are constructively superimposed depends on the current switching cycle of the control unit 12. The striker 4 is pulled into the section 39, 41 with a constructive superimposition. An alternating polarity change of the switchable magnetic field 38 drives the back-and-forth movement of the striker 4.

Figure 4:
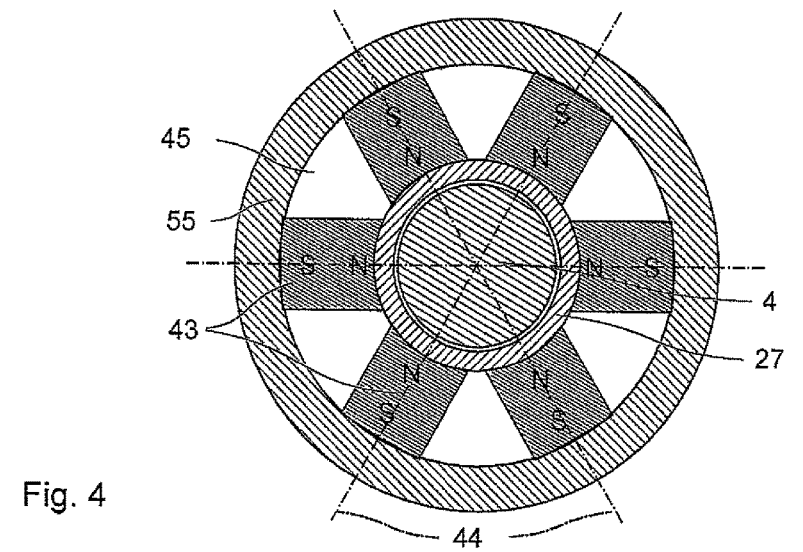
FIG. 4: a sectional view through the striking mechanism in the plane IV-IV.

The permanent magnetic field 37 is generated by a radially magnetizable ring magnet 42 consisting of several permanent magnets 43. FIG. 4 shows the ring magnet 42 in a sectional view in the plane IV-IV. The permanent magnets 43 shown by way of an example are preferably rod magnets. The permanent magnets 43 are oriented in the radial direction. Their magnetic field axes 44, that is to say, from their south pole to the north pole, are perpendicular to the movement axis 3. The permanent magnets 43 all have the same orientation; in the example shown, their north pole N faces the movement axis 3 while the south pole S faces away from the movement axis 3. In the circumferential direction between the permanent magnets 43, there can be an air gap or a non-magnetizable material 45, for instance, plastic. The ring magnet 42 is arranged along the movement axis 3 between the closure surface 31 and the striking block 13. Preferably, the ring magnet 42 is arranged asymmetrically, especially closer to the closure surface 31 than to the striking block 13. The position of the ring magnet 42 divides the guide tube 27 along the movement axis 3 into an upper section 39 that is located in front of the ring magnet 42 as seen in the striking direction 5, and a lower section 41 that is located behind the ring magnet 42 as seen in the striking direction 5. In the upper section 39, the field lines run largely in the opposite direction in comparison to the field lines in the lower section 41. The permanent magnets 43 preferably contain an alloy of neodymium. The field strength at the poles of the permanent magnets 43 is preferably above 1 Tesla, for instance, up to 2 Tesla.

Figure 5:
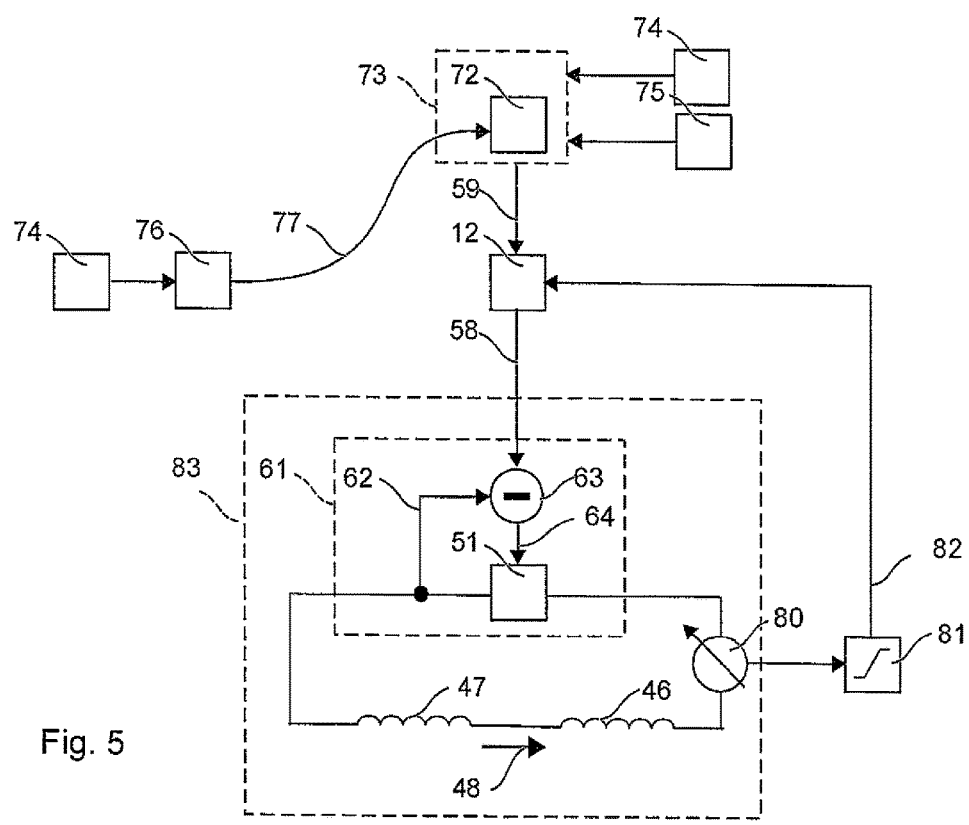
FIG. 5: electric circuitry of the striking mechanism

The switchable magnetic field 38 is generated by an upper magnet coil 46 and a lower magnet coil 47. The upper magnet coil 46 is arranged in front of the ring magnet 42 as seen in the striking direction 5, preferably directly in contact with the ring magnet 42. The upper magnet coil 46 surrounds the upper section 39 of the guide tube 27. The lower magnet coil 47 is arranged behind the ring magnet 42, preferably in contact with the ring magnet 42, as seen in the striking direction 5, and it surrounds the lower section 41. A current 48 flows through the two magnet coils 39, 46 in the same direction of rotation around the movement axis 3. The upper magnetic field 49 generated by the upper magnet coil 46 and the lower magnetic field 50 generated by the lower magnet coil 47 are largely parallel to the movement axis 3 and are both oriented in the same direction along the movement axis 3, that is to say, the field lines of both magnet coils 49, 50 run either inside the guide tube 27 in the striking direction 5 or opposite to the striking direction 5. The current 48 is fed into the magnet coils 46, 47 by a controllable current source 51. Preferably, the two magnet coils 47, 47 and the current source 51 are connected in series (FIG. 5).

A length 52—that is to say, the dimension along the movement axis 3—of the magnet coil 47 is preferably greater than the length 53 of the upper magnet coil 46; the length ratio is within the range from 1.75:1 to 2.25:1. As far as the field strength of the upper magnetic field 49 is concerned, the appertaining values of the magnet coils 46, 47 are preferably the same as the field strength of the lower magnetic field 50 inside the guide tube 27. The ratio of the number of windings of the upper magnet coil 46 to the number of windings of the lower magnet coil 47 can match the length ratio. The radial dimensions 54 and the surface current density are preferably the same for both magnet coils 46, 47 (without the other components of the striking mechanism).

A magnetic yoke 55 can conduct the magnetic fields 37, 38 outside of the guide tube 27. The yoke 55 has, for instance, a hollow cylinder or a cage that consists of several ribs running along the movement axis 3 and that surrounds the two magnet coils 46, 47 and the ring magnet 42 made up of permanent magnets 43. A ring-shaped upper cap 56 of the yoke 55 covers the upper magnet coil 46 opposite to the striking direction 5. A ring-shaped lower cap 57 adjoins the guide tube 27 at the height of the striking block 13. The lower cap 57 covers the lower magnet coil 47 in the striking direction 5. The magnetic fields 37, 38 are guided in the upper section 39 and in the lower section 41 parallel or anti-parallel to the movement axis 3. The magnetic fields 37, 38 of the yoke 55, especially of the ring-shape caps 56, 57, are fed in in the radial direction. A radial return takes place in the lower section 41 largely inside the striking block 13. Consequently, the field lines are preferably perpendicular to the end face 26 of the striker 4 and of the striking surface 58 of the striking block 13. In the upper section 39, the radial return into the yoke 56 can take place without guidance, that is to say, through the air.

The magnetic yoke 55 is made of a magnetizable material, preferably of magnetic sheet steel. The guide tube 27 is not magnetizable. Suitable materials for the guide tube 27 include chromium steel, or as an alternative, aluminum or plastics. The closure 30 of the guide tube 27 is preferably made of a non-magnetizable material.

The striker 4 preferably overlaps with both magnet coils 46, 47 in each of its positions. In particular, the rear end face 26 projects into the upper magnet coil 46 when the striker 4 is in contact with the striking block 13 or else at least into the ring magnet 42. The rear end face 26 protrudes beyond at least the axial center of the ring magnet 42. The ventilation opening 36 of the pneumatic chamber 34 is arranged at the axial height of an end of the upper magnet coil 46 facing the ring magnet 42. The distance 35 to the ring magnet 42 is preferably less than 1 cm.

A control unit 12 of the striking mechanism 2 regulates the current source 51. By means of a control signal 59, the current source 51 sets the output current 48 at a target value 60 prescribed by the control unit 12. The current source 51 preferably contains a control loop 61 for purposes of stabilizing the output current 48 at the target value 60. A tap measures the actual current 62. On the basis of the actual current 48 and of the target value 60, a differential amplifier 63 forms a control quantity 64 that is fed to the current source 51 in order to regulate the current delivery. The current source 51 is fed from a current supply 65, for instance, a mains connection or a battery pack.

Figure 6:
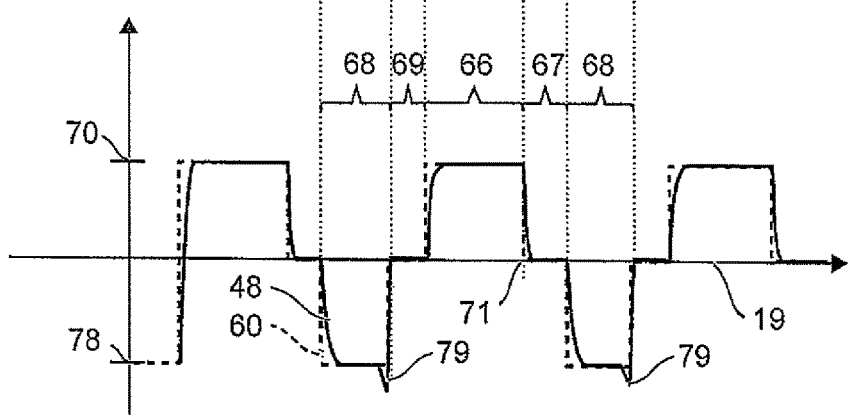
FIG. 6: a control diagram.

The control unit 12 switches the target value 60 and indirectly the current 48 during a back-and-forth movement of the striker 4. By way of an example, FIG. 6 illustrates a repeating switching pattern over the course of time 19. The switching pattern is essentially divided into three different phases. A cycle begins with an active return phase 66. During the active return phase 66, the striker 4 is accelerated out of the striking position opposite from the striking direction 5. The active return phase 66 ends when the air cushion 23 has reached a prescribed potential energy. The active return phase 66 is directly followed by a resting phase 67 that ends when the striker 4 reaches the upper turning point 15. The acceleration phase 68 begins when or after the striker 4 passes the upper turning point 15. During the acceleration phase 68, the striker 4 is accelerated in the striking direction 5, preferably continuously until the striker 4 strikes the striking block 13. Depending on the desired striking frequency, there can be a pause 69 after the acceleration phase 68, before the next active return phase 66 begins.

The control unit 12 initiates a new strike with an active return phase 66. The control unit 12 prescribes a first value 70 as the target value 60 for the regulated current source 51. The sign of the first value 70 determines that the current 48 circulates in the magnet coils 47 in such a way that the magnetic field 49 of the upper magnet coil 46 is constructively superimposed with the permanent magnetic field 37 in the upper section 39 of the guide tube 27. The striker 4 is then accelerated in the upper section 39 opposite to the striking direction 5 and opposite to a force of the air cushion 23. The kinetic energy of the striker 4 increases continuously. Due to the backwards movement, the air cushion 23 is compressed at the same time and the potential energy stored in it rises due to the volume work that has been performed.

The current 48 preferably passes through both magnet coils 46, 47. Preferably, the magnetic fields 37, 38 are destructively superimposed in the lower section 41. The magnitude of the first value 70 can be selected in such a way that the magnetic field 50 generated by the lower magnet coil 47 destructively compensates for the permanent magnetic field 37 of the permanent magnets 43. The magnetic field strength in the lower section 41 is preferably lowered to zero or to less than 10% of the magnetic field strength in the upper section 39. The current source 51 and the magnet coils 46, 47 are configured for the current 48 with the current intensity of the first value 70. The first value 70 can be kept constant during the active return phase 66.

The control unit 12 triggers the end of the active return phase 66 on the basis of a prognosis about the potential energy of the air cushion 23 in the upper turning point 15. The primary drive 22 is deactivated, for example, when the potential energy is going to reach a target value without additional assistance from the primary drive 22. In this context, it is taken into consideration that, at the point in time 71 of the switch-off of the primary drive 22, the potential energy has already reached part of the target value and the momentary kinetic energy of the striker 4 up to the upper turning point 15 is converted into the part of the target value that was missing up until then. Losses during the conversion can also be taken into account by means of a table 72 that is stored in the control unit 12. The target value lies within the range from 25% to 40%, e.g. 30%, and, for instance, at the maximum 37%, of the striking energy of the striker 4.

A prognosis device 73 continuously compares the operating conditions of the striking mechanism 2. An example of a prognosis is one based on a pressure measurement. The prognosis device 73 taps the signals from the pressure sensor 74. The measured pressure is compared to a threshold value. If the pressure exceeds the threshold value, the prognosis device 73 emits a control signal 59 to the control unit 12. The control signal 59 indicates that the potential energy reaches the target value when the primary drive 22 is immediately switched off. The control unit 12 ends the active return phase 66.

The prognosis device 73 preferably loads the threshold value from the stored reference table 72. The reference table 72 can contain precisely one threshold value. Preferably, however, several threshold values previously determined for different operating conditions are stored. For instance, threshold values for different temperatures in the pneumatic chamber 34 can be stored. The prognosis device 73 picks up not only the signal from the pressure sensor 74 but also a signal from a temperature sensor 75. The threshold value, for example, is selected as a function of the signal from the temperature sensor 75.

Moreover, the prognosis device 73 can estimate the speed of the striker 4 on the basis of a pressure change. The reference table 72 can contain different threshold values for the momentary pressure for different speeds. Since a faster striker 4 has the tendency to compress the air cushion 23 more strongly, the threshold value is smaller for a higher speed than for a lower speed. The selection of the threshold value as a function of the speed or of the pressure change can improve the reproducibility of the target value.

The end of the active return phase 66 is, at the same time, the beginning of the resting phase 67. The control unit 12 sets the target value 60 for the current 48 to zero. The switchable magnetic field 38 is switched off and the primary drive 22 is deactivated. The permanent magnetic field 37 acts on the striker 4, but, since the permanent magnetic field 37 has a constant field strength essentially along the movement axis 3, it only exerts a small force or no force at all onto the striker 4.

Instead of lowering the current 48 to zero, the current 48 can be set in the resting phase 67 to a value that is negative with respect to the target value 60. This causes the remanence in the striker 4 to be eliminated. The value of the current 48 in comparison to the target value 60 is small, for instance, less than 10%, in order not to interfere with the return movement.

The striker 4 is braked all the way to a standstill by the air cushion 23 during the resting phase 67. In this process, the potential energy of the air cushion 23 still increases by part of the kinetic energy of the striker 4 before the striker 4 reaches a standstill, that is to say, reaches the upper turning point 15.

The sequence of the active return phase 66 and of the resting phase 67 proves to be particularly energy-efficient in the case of the tested add-on features of the striking mechanism, especially the switch-off of the current 48 to zero at the end of the active return phase 66. The efficiency of the primary drive 22 declines as the distance 35 between the striker 4 and the upper turning point 15 decreases. The striker 4 is accelerated to a high speed as long as the primary drive 22 is working efficiently. If the prognosis shows that the striker 4 can now reach the desired upper turning point 15 without the primary drive 22, then the primary drive 22, which is now working less and less efficiently, is deactivated. In one alternative, the current 48 is lowered to zero continuously or in several steps. In this context, at the expense of the efficiency, an adaptation of the trajectory of the striker 4 can be carried out in order to reach the upper turning point 15. Also in the case of this alternative, this is preferably followed by the resting phase 67 before the upper turning point 15 is reached.

The duration of the active return phase 66 results from the prognosis. Depending on the operation or else from one strike to the next, the duration can be of different lengths. For example, the striking block 13 does not reach its basic position 16 before a strike, as a result of which the striker 4 has to travel a longer path for the next strike. In the case of a fixed duration of the active return phase 66, the absorbed kinetic energy would not be sufficient for the striker 4 to reach the desired upper turning point 15 against the force of the air cushion 23.

The control unit 12 triggers the end of the resting phase 67 on the basis of the upper turning point 15 having been reached. The end of the resting phase 67 marks the beginning of the acceleration phase 68. The control unit 12 triggers the beginning of the acceleration phase 68 on the basis of the reversal movement of the striker 4. A position sensor or movement sensor can directly detect the reversal movement of the striker 4. Preferably, the detection of the reversal movement is based indirectly on a pressure change in the pneumatic chamber 34.

A pressure sensor 74 is coupled to the pneumatic chamber 34. The pressure sensor 74 is, for example, a piezo-resistive pressure sensor 74. The pressure sensor 74 can be installed in the pneumatic chamber 34, or else it can be coupled to the pneumatic chamber 34 via an air channel. The pressure sensor 74 is preferably arranged on or in the closure 30. An evaluation unit 76 is associated with the pressure sensor 74. The evaluation unit 76 monitors a pressure change in the pneumatic chamber 34. As soon as the pressure change has acquired a negative value, that is to say, once the pressure has fallen, the evaluation unit 76 emits a control signal 77 to the control unit 12 indicating that the striker 4 has reached the upper turning point 15.

For reasons having to do with the process, the evaluation of the pressure change leads to a slight delay until it is detected that the upper turning point 15 has been reached, or to put it more precisely, that it has been passed. The pressure can also be detected absolutely and compared to a threshold value. Once the pressure has reached the threshold value, the output of the control signal 77 is triggered. The pressure in the pneumatic chamber 34 can be measured in the upper turning point 15 and can be stored as the threshold value in a table of the evaluation unit 76. The threshold value can be stored as a function of various operating conditions, especially the temperature in the pneumatic chamber 34. The evaluation unit 76 ascertains the operating conditions at hand, for instance, by querying a temperature sensor, and reads the applicable threshold value out of the table. The two methods can be combined redundantly and can output the control signal 77 separately from each other.

The control unit 12 begins the acceleration phase 68 once the control signal 77 has been received. The control unit 12 sets the target value 60 for the current 48 to a second value 78. The sign of the second value 78 is selected in such a way that the lower magnetic field 50 of the lower magnet coil 47 is constructively superimposed with the permanent magnetic field 37 inside the guide tube 27. Therefore, the result is a high field strength in the lower section 41 of the guide tube 27. The current 48 is fed into the lower magnet coil 47 during the acceleration phase 68 and preferably into the upper magnet coil 46. The permanent magnetic field 37 in the upper section 39 is preferably damped or else completely compensated for destructively by the magnetic field 38 of the upper magnet coil 46 inside the guide tube 27. The striker 4 is pulled into the stronger magnetic field in the lower section 41. During the acceleration phase 68, the striker 4 experiences an acceleration in the striking direction 5. The kinetic energy that is reached up to the turning point 14 is approximately the striking energy of the striker 4.

An alternative or additional determination that the upper turning point 15 has been reached is based on a change in the voltage induced in the upper magnet coil 46 due to the movement of the striker 4. The striker 4 can overlap with the upper yoke ring 56 already before the upper turning point 15 has been reached. In the upper area 39, the magnetic field 49 of the ring magnet 42 flows almost completely closed without an air gap via the striker 4 into the upper yoke ring 56. In the lower area 41, the magnetic field 50 of the ring magnet 42 flows over a large air gap to the lower yoke ring 57. During the movement of the striker 4 to the turning point 51, the air gap in the lower area 41 expands further, as a result of which the magnetic flux rises proportionally in the upper area. As soon as the striker 4 reverses at the turning point 15, the magnitude of the magnetic flux in the upper area 39 decreases. The change in the magnetic flux induces a voltage in the upper magnet coil 46. A change in the sign of the induced voltage is characteristic of the turning point 15. Before the turning point 15 has been reached, the current source 51 regulates the current 48, preferably to zero, in order to observe the resting phase 67. The control loop continuously adapts the control quantity 64 in order to keep the current 48 at zero against the induced voltage. In response to the change in the sign of the induced voltage, the control loop 62 responds with a considerably larger control quantity 64. Thus the control signal 77 can be triggered by the control quantity 64, for instance, when a threshold value is exceeded.

The magnitude of the second value 78 is preferably coordinated in such a way that the upper magnetic field 49 precisely destructively compensates for the permanent magnetic field 37, or else drops to at least 10% of its field strength. In the beginning of the acceleration phase 68, the current 48 in the magnet coils 46, 47 rises to the target value 60. A switching edge is prescribed, for example, only by a time constant that results from the inductivity of the magnet coils 46, 47 and of the reaction of the striker. The control unit 12, preferably continuously, keeps the target value 60 at the second value 78 during the acceleration phase 68.

The air cushion 23 assists the acceleration of the striker 4 in the striking direction 5. Here, potential energy stored in the air cushion 23 is largely converted into kinetic energy of the striker 4. At the striking point 14, the air cushion 23 is preferably completely relaxed. Close to the striking point 14, the striker 4 opens the ventilation opening 36. The ventilation opening 36 causes a weakening of the air cushion 23 without completely reducing its effect on the striker 4 to a value of zero. At this point in time, however, the air cushion 23 has already clearly transferred more than 90% of its potential energy to the striker 4.

The control unit 12 triggers the end of the acceleration phase 68 on the basis of an increase 79 of the current 48 in the lower magnet coil 47 or of the current 48 fed in by the current source 51. While the striker 4 is moving, the electromagnetic induction via the lower magnet coil 47 causes a voltage drop against which the current source 51 feeds in the current 48. With the impact and with the stationary striker 4, the voltage drop disappears abruptly. The current 48 rises briefly until the regulated current source 51 once again regulates the current 48 back to the target value 60.

A current sensor 80 can detect the current 48 that is circulating in the lower magnet coil 47. An associated discriminator 81 compares the measured current 48 to a threshold value and emits an end signal 82 when the threshold value has been exceeded. The end signal 82 shows the control unit 12 that the striker 4 has struck the striking block 13. The threshold value is selected, for instance, as a function of the second value 78, that is to say, the target value 60 for the acceleration phase 68. The threshold value can be 5% to 10% larger than the second value 78. As an alternative or in addition to the detection of the absolute current 48, the rate of change of the current 48 can be detected by means of the current sensor 80 and can then be compared by the discriminator 81 to a threshold value for the rate of change.

The control loop 61 of the current source 51 counters the increase 79 of the current 48 in the current circuit 83. The control quantity 64 changes in this process. Instead of or in addition to a change in the current 48, the control quantity 64 can also be monitored. The absolute value, or preferably a rate of change of the control quantity 64, can be compared to a threshold value, in response to which the end signal 82 can be emitted.

The control unit 12 ends the acceleration phase 68 once the end signal 82 has been received. The target value 60 is set to zero. Accordingly, the current output from the current source 51 is reduced to a current 48 having the value of zero. The striker 4 is no longer accelerated in the striking direction 5.

The control unit 12 can initiate the next active return phase 66 immediately after the acceleration phase 68 or after a pause.

What is claimed is:

1. A power tool comprising:
   a bit socket configured to hold a chiseling bit movable along an axis of movement; and
   a magneto-pneumatic striking mechanism including a primary drive arranged around the axis of movement and having a first magnet coil, a ring magnet and a second magnet coil arranged consecutively in a striking direction, and, on the axis of movement, inside the magnet coils, the striking mechanism having a striker and a striking block arranged consecutively in the striking direction, and the striking mechanism having an air cushion acting upon the striker in the striking direction, the ring magnet being permanently magnetic and magnetized radially relative to the axis of movement
   wherein a field strength of the ring magnet is above 1 Tesla.

2. The power tool as recited in claim 1 wherein the ring magnet includes a plurality of permanent magnets all facing the axis of movement with a same magnetic pole.

3. The power tool as recited in claim 1 wherein a current fed into the first magnet coil and a second current fed into the second magnet coil have a same direction of rotation around the axis of movement.

4. The power tool as recited in claim 1 further comprising a control unit actuating the first and second magnet coils in alternating phases, a first magnetic field generated by the first magnet coil inside the first magnet coil being superimposed with the magnetic field of the ring magnet constructively in a first phase and destructively in a second phase, while a second magnetic field generated by the second magnet coil inside the second magnet coil is superimposed with the magnetic field of the ring magnet destructively in the first phase and constructively in the second phase.

5. The power tool as recited in claim 1 wherein the striker is made of a soft-magnetic material.

6. The power tool as recited in claim 1 further comprising a stationary closure closing off the air cushion opposite from the striking direction.

7. The power tool as recited in claim 1 wherein the striking block projects into the second magnet coil or into a yoke adjoining the second magnet coil in the striking direction.

8. The power tool as recited in claim 7 wherein the striking block is made of a soft-magnetic material.

9. The power tool as recited in claim 1 wherein, in every position, the striker partially overlaps at least one of the first and second magnet coils, and partially the ring magnet.

10. The power tool as recited in claim 1 wherein a first length of the first magnet coil is smaller than a second length of the second magnet coil.

11. The power tool as recited in claim 10 wherein a ratio of the second length to the first length is between 1.75 and 2.25.

12. The power tool as recited in claim 1 further comprising a guide tube oriented coaxially to the axis of movement, the first magnet coil, the ring magnet and the second magnet coil being arranged around the guide tube, the air cushion and the striker being arranged inside the guide tube.

13. A power tool comprising:
    a bit socket configured to hold a chiseling bit movable along an axis of movement; and
    a magneto-pneumatic striking mechanism including a primary drive arranged around the axis of movement and having a first magnet coil, a ring magnet and a second magnet coil arranged consecutively in a striking direction, and, on the axis of movement, inside the magnet coils, the striking mechanism having a striker and a striking block arranged consecutively in the striking direction, and the striking mechanism having an air cushion acting upon the striker in the striking direction, the ring magnet being permanently magnetic and magnetized radially relative to the axis of movement;

further comprising a magnetic yoke surrounding the first and second magnet coils and the ring magnet.

14. The power tool as recited in claim 13 wherein the magnetic yoke has a ring-shaped first cap covering the first magnetic coil and a ring-shaped second cap covering the second coil.

15. A power tool comprising:
a bit socket configured to hold a chiseling bit movable along an axis of movement; and
a magneto-pneumatic striking mechanism including a primary drive arranged around the axis of movement and having a first magnet coil, a ring magnet and a second magnet coil arranged consecutively in a striking direction, and, on the axis of movement, inside the magnet coils, the striking mechanism having a striker and a striking block arranged consecutively in the striking direction, and the striking mechanism having an air cushion acting upon the striker in the striking direction, the ring magnet being permanently magnetic and magnetized radially relative to the axis of movement further comprising a control unit controlling a current and a prognosis device continually measuring a potential energy of the air cushion.

16. The power tool as recited in claim 15 wherein the control unit controls the current on the basis of a control signal emitted by the prognosis device.

17. The power tool as recited in claim 15 wherein the prognosis device receives a signal from a pressure sensor measuring a pressure in the air cushion.

18. The power tool as recited in claim 17 wherein the prognosis device receives a further signal from a temperature sensor measuring a pressure in the air cushion.

19. The power tool as recited in claim 17 wherein the prognosis device estimates a speed of the striker as a function of a pressure change.

* * * * *